United States Patent
Rohr et al.

(10) Patent No.: US 7,782,329 B2
(45) Date of Patent: Aug. 24, 2010

(54) METHOD AND APPARATUS FOR PROTECTED GRAPHICS GENERATION

(75) Inventors: Tom C. Rohr, Hiawatha, IA (US); Jeffrey D. Russell, Marion, IA (US); Martin Pauly, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 1413 days.

(21) Appl. No.: 11/009,532

(22) Filed: Dec. 10, 2004

(65) Prior Publication Data
US 2006/0130068 A1    Jun. 15, 2006

(51) Int. Cl.
G06F 13/372    (2006.01)
G06F 13/18    (2006.01)
G06F 9/46    (2006.01)
G06F 9/44    (2006.01)
G09G 5/00    (2006.01)

(52) U.S. Cl. ........................ 345/534; 345/535; 345/581; 718/108; 712/228

(58) Field of Classification Search ................. 345/531, 345/534, 535, 581; 718/100–108; 712/228
See application file for complete search history.

(56) References Cited

U.S. PATENT DOCUMENTS

| | | | | |
|---|---|---|---|---|
| 4,809,160 A | * | 2/1989 | Mahon et al. | 726/4 |
| 7,055,038 B2 | * | 5/2006 | Porter et al. | 713/193 |
| 7,474,312 B1 | * | 1/2009 | Rohrer et al. | 345/530 |
| 2002/0038333 A1 | * | 3/2002 | Evans et al. | 709/107 |

* cited by examiner

*Primary Examiner*—Hau H Nguyen
(74) *Attorney, Agent, or Firm*—Matthew J. Evans; Daniel M. Barbieri

(57) ABSTRACT

Presently disclosed are a method and apparatus for generating graphics in a protected manner by establishing a user graphics partition while in an executive context. Once the user context is established, an operating mode is switched to the user context and then executing a user graphics program while in the user context. The operating mode then reverts to the executive context when the user context expires.

11 Claims, 10 Drawing Sheets

METHOD AND APPARATUS FOR PROTECTED GRAPHICS GENERATION

BACKGROUND

The video display has become the quintessential means for displaying computer information to a user. Today, we are all familiar with the video monitor that is connected to our personal computer. Inside the personal computer is a display generator. The display generator receives information from the main processor included in the personal computer. It should be appreciated that the main processor executes application programs like word processors, spreadsheets and e-mail clients. As the main processor executes a particular application, that application causes the processor to generate a series of video display instructions. The video display instructions are then delivered to the display generator. The display generator executes the video display instructions in order to form an image on the video monitor.

Every now and then, the video display on a personal computer becomes corrupted. Sometimes new lines appear over other lines. Another interesting display artifact occurs when we try to scroll a user window—part of the window simply won't scroll correctly. Most of us are now familiar with various display artifacts that are caused by the display generator. These normally occur when we switch applications or scroll a user window. This happens because applications and various scrollable user windows all share the same display generator. In this type of an environment, the various applications that are executing in a personal computer are typically not aware of each other. As such, one application may interfere with the video presentation that another application is attempting to create.

In most commercial applications, such as in a personal computer, users can easily tolerate display artifacts that occur as one application interferes with the video presentation of another. There are, however, other domains where such display artifacts are not only insufferable, but such artifacts can lead to a catastrophic result. Consider, for example, a display system in a power plant. A display system in a power plant may be used to present current power levels, operating temperatures and other vital information. In fact, an engineer responsible for operating a power plant may rely on the information presented on a video display to make critical operational decisions. A wrong decision in this type of situation can lead to brown-outs—or worse.

Video displays are also commonly used to present information to the operator of a motor vehicle, a maritime vessel and an aircraft. In each of these illustrative use cases, an error in presentation of an intended image may lead to dire consequences. Because of this, many display devices in motor vehicles, maritime vessels and aircraft are created as single-function displays. This, though, is problematic because most of these display devices are situated in an operator's console. Because the space in the operator's console is limited, there is strong motivation to develop and use multi-purpose displays. In fact, avionics in a modern aircraft will be designed with multiple-use displays. Today, there are even aircraft consoles that are highly integrated. In these highly integrated consoles, one main display is used simultaneously by numerous aircraft functions.

Because a multi-purpose display still uses a single graphics generator to drive the display device, the single display generator is shared amongst a plurality of different application programs, all executing in a common environment. This results in a distinct probability that one application will eventually corrupt the appearance of a display generated by another application.

One means for reducing the risk associated with such cross-application corruption of a display system is to use a highly partitioned processing system. In a highly partitioned processing system, the resources available to a processor executing multiple functions (i.e. applications) are shared in structured manner. For example, memory is partitioned to ensure that one application process does not encroach on memory allocated to another process. In a multi-process environment, there are other techniques that are commonly employed to protect the resources used by one process from inadvertent access by another process. For example, hardware checks can be employed to make sure that a network interface is only accessed by a protocol stack. These same hardware checks can also be used to make sure that a lower priority task does not preempt a higher priority task.

All of these techniques fail to protect an image created by one task from corruption by another process executing in the same multi-process environment. The reason for this is that all of the processes executing in the multi-process environment need, in essence, unbridled access to the display generator that actually generates the video signal that drives a video display. When one task is given uncontrolled access to the display generator, there is nothing to prevent that task from corrupting another image previously rendered by the display generator when it was controlled by another task.

SUMMARY

Presently disclosed are a method and apparatus for generating graphics in a protected manner by establishing a user graphics partition while in an executive context. Once the user context is established, an operating mode is switched to the user context and then executing a user graphics program while in the user context. The operating mode then reverts to the executive context when the user context expires.

BRIEF DESCRIPTION OF THE DRAWINGS

The present invention will hereinafter be described in conjunction with the appended drawings and figures, wherein like numerals denote like elements, and in which.

DETAILED DESCRIPTION OF THE INVENTION

Figure 1:
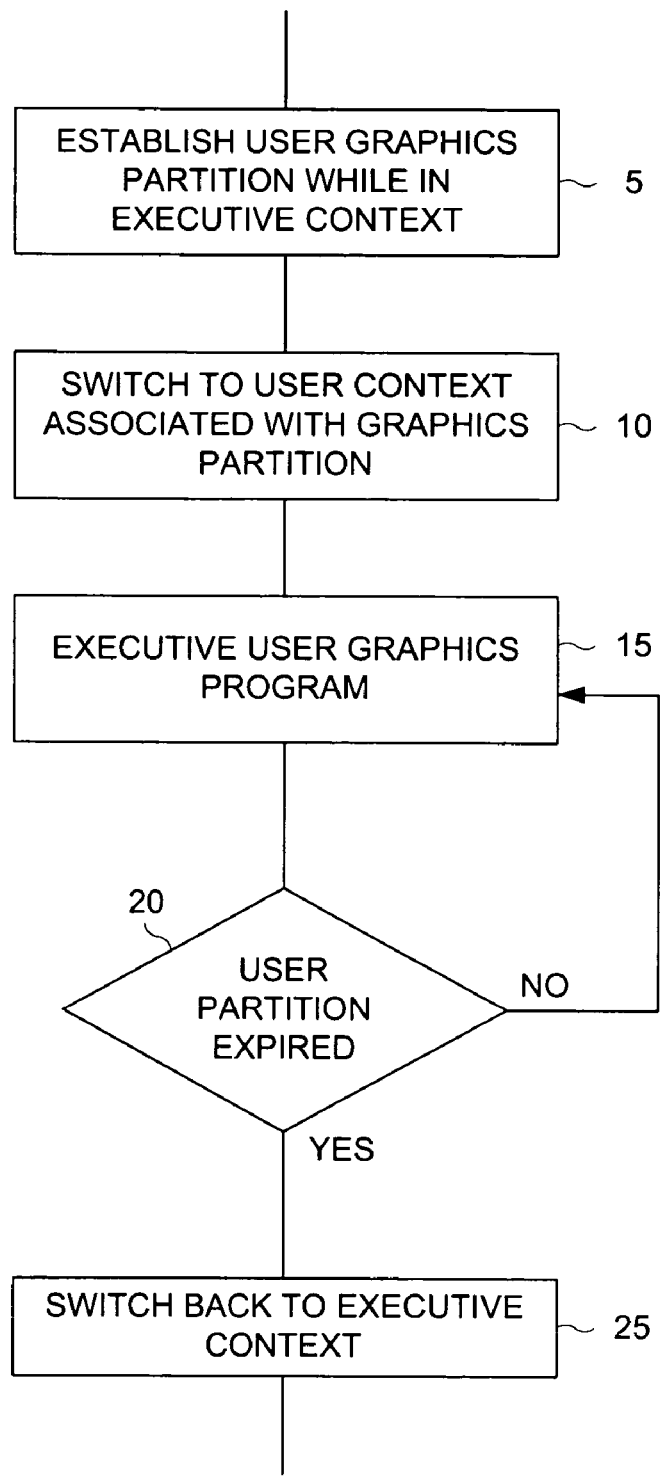
FIG. 1 is a flow diagram that depicts one example method for generating graphics in a protected manner.

FIG. 1 is a flow diagram that depicts one example method for generating graphics in a protected manner. According to this example method, generating graphics in a protected manner is accomplished by establishing a user graphics partition while in an executive context (step 5). Then, once the user graphics partition is established, a user context is adopted (step 10). It should be appreciated that the user context that is adopted is associated with the graphics partition established according to the present method. According to the present method, a user graphics program is executed (step 15) so long as the user partition has not expired (step 20). Once the user partition expires, the executive context is adopted (step 25).

According to one illustrative use case, the present method is applied in a graphics generator, which is a specialized processor tailored by its design to render graphic images in accordance with a graphics program. It should be appreciated that the graphics program typically includes a sequence of graphic rendering instructions which are delivered to the graphics generator by a system (or host) processor.

Figure 2:
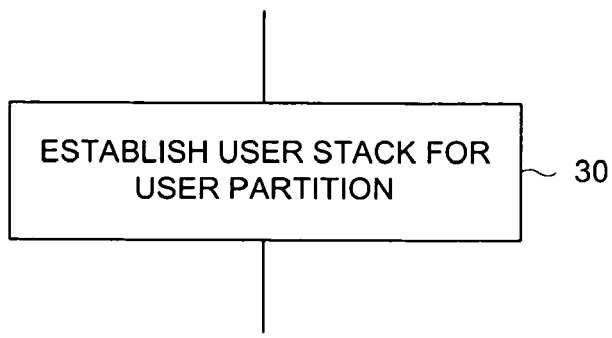
FIG. 2 is a flow diagram that depicts one illustrative alternative method for establishing a user graphics partition.

FIG. 2 is a flow diagram that depicts one illustrative alternative method for establishing a user graphics partition. According to this illustrative method, a user graphics partition is established by establishing a program stack for a user graphics partition. For example, since a graphics processor, according to the present method, establishes a user partition in an executive context, it becomes apparent through the teaching presented herein that the user partition is established for executing a user graphics program. A user graphics program, much like any other instruction sequence, will benefit from the availability of an execution stack. In order to ensure that the user program does not corrupt a stack that is used in an executive context, this illustrative variation of the present method provides for establishing a special stack for the user partition. Generally, a user context is adopted when the user program is executed. While in the user context, the special stack is used by the execution unit in a graphics generator as it executes a user graphics program. It should also be understood that a plurality of new stacks can be established according to the present method. For example, a different stack is created for each new partition that is created. It should also be apparent that each new partition created according to the teachings of the present method will have a new user context created and associated therewith.

Figure 3:
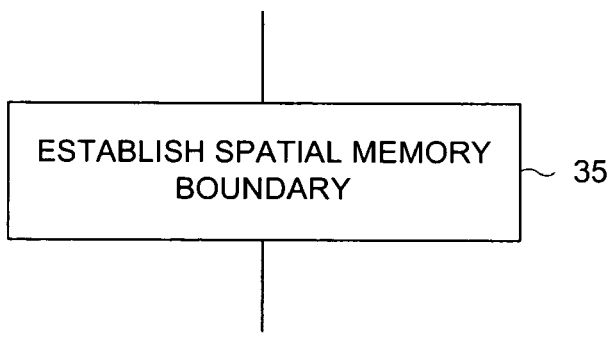
FIG. 3 is a flow diagram that depicts one example variation of the present method for establishing a user graphics partition with protected memory.

FIG. 3 is a flow diagram that depicts one example variation of the present method for establishing a user graphics partition with protected memory. According to this variation of the present method, a new user partition is established by establishing a spatial memory boundary. Said spatial memory boundary is established for the new user partition. According to one variation of the present method, the established spatial memory boundary is associated with a new user context. Accordingly, the established memory boundary is invoked when the user context is used.

Figure 4:
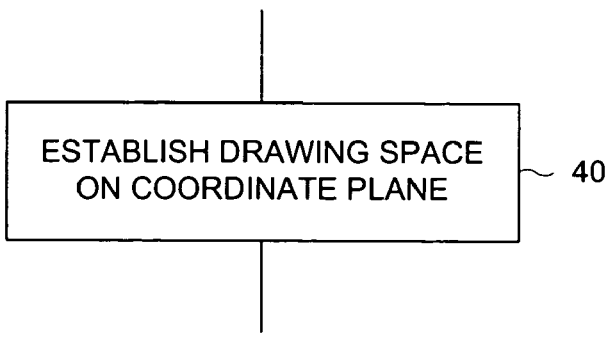
FIG. 4 is a flow diagram that depicts one example method for establishing a spatial memory boundary.

FIG. 4 is a flow diagram that depicts one example method for establishing a spatial memory boundary. According to this variation of the present method, a spatial memory boundary is established by establishing a drawing region on a coordinate plane. According to one variation of this example method, a drawing region is established by establishing a rectangular drawing region on a coordinate plane. It should be appreciated that this example of a rectangular drawing region is set forth here to illustrate the present method and is not intended to limit the scope of the claims appended hereto. It should be further appreciated that drawing region can take on any closed form. For example, a series of line segments and/or arbitrary curves can be used to form a closed region. It should be further appreciated that a plurality of user partitions can be defined to exist at the same time. Accordingly, different drawing regions can be specified for different concurrent user partitions. According to one variation of the present method, a drawing region for a partition is specified by specifying a bitmap. In this variation of the present method, the bitmap represents an arbitrary definition of pixels than can be modified by a particular graphics partitions. Hence, according to yet another variation of the present method, a logical "1" in a bitmap pixel position would indicate that the corresponding pixel position (relative to the entire pixel space of a particular display) can be modified by the particular partion for which a drawing region is specified by such bitmap.

Figure 5:
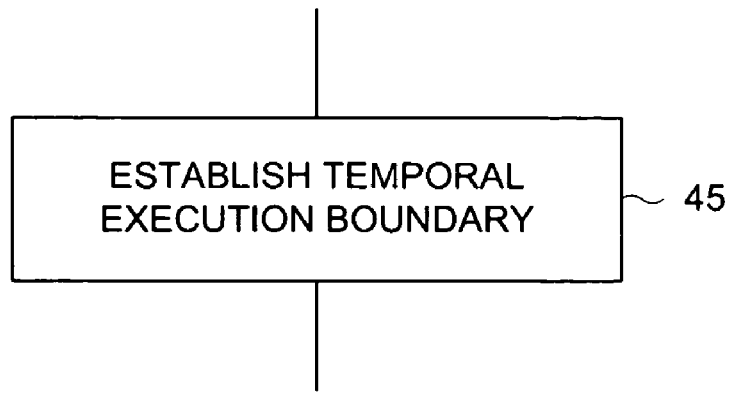
FIG. 5 is a flow diagram that depicts one alternative method for establishing a user graphics partition with a temporal execution limit.

FIG. 5 is a flow diagram that depicts one alternative method for establishing a user graphics partition with a temporal execution limit. According to this alternative method, a user graphics partition is established by establishing a temporal execution boundary for the user graphics partition. According to one illustrative use case, a temporal execution boundary that is established for a user graphics partition is associated with a user context, wherein said user context is associated with the user graphics partition. It should be appreciated that a graphics generator that includes an execution unit will execute a user graphics program in a new user context (i.e. partition). Once the execution unit begins to execute the user program in the user context, there must be some means to ensure that the user program does not take permanent control over the execution unit. Accordingly, by limiting the temporal execution of a user context, the execution unit is forced to abandon the user context when the user program runs amuck.

Figure 6:
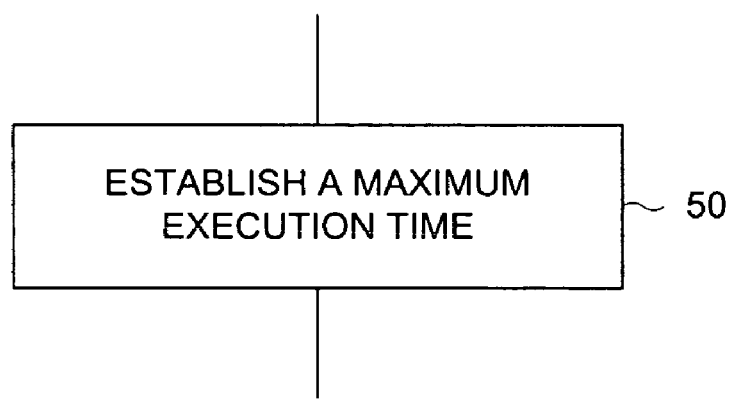
FIG. 6 is a flow diagram that depicts an example method for establishing a temporal execution boundary.

FIG. 6 is a flow diagram that depicts an example method for establishing a temporal execution boundary. According to this example method, a temporal execution boundary is established by establishing a maximum execution time for the user partition. It should be appreciated that the user partition is generally associated with a new user context and that the established maximum execution time is typically associated with the new user context. It should further be appreciated that different user partitions (each identified by a user context identifier) can exist contemporaneously. As such, different maximum execution times can be specified for different user partitions.

Figure 7:
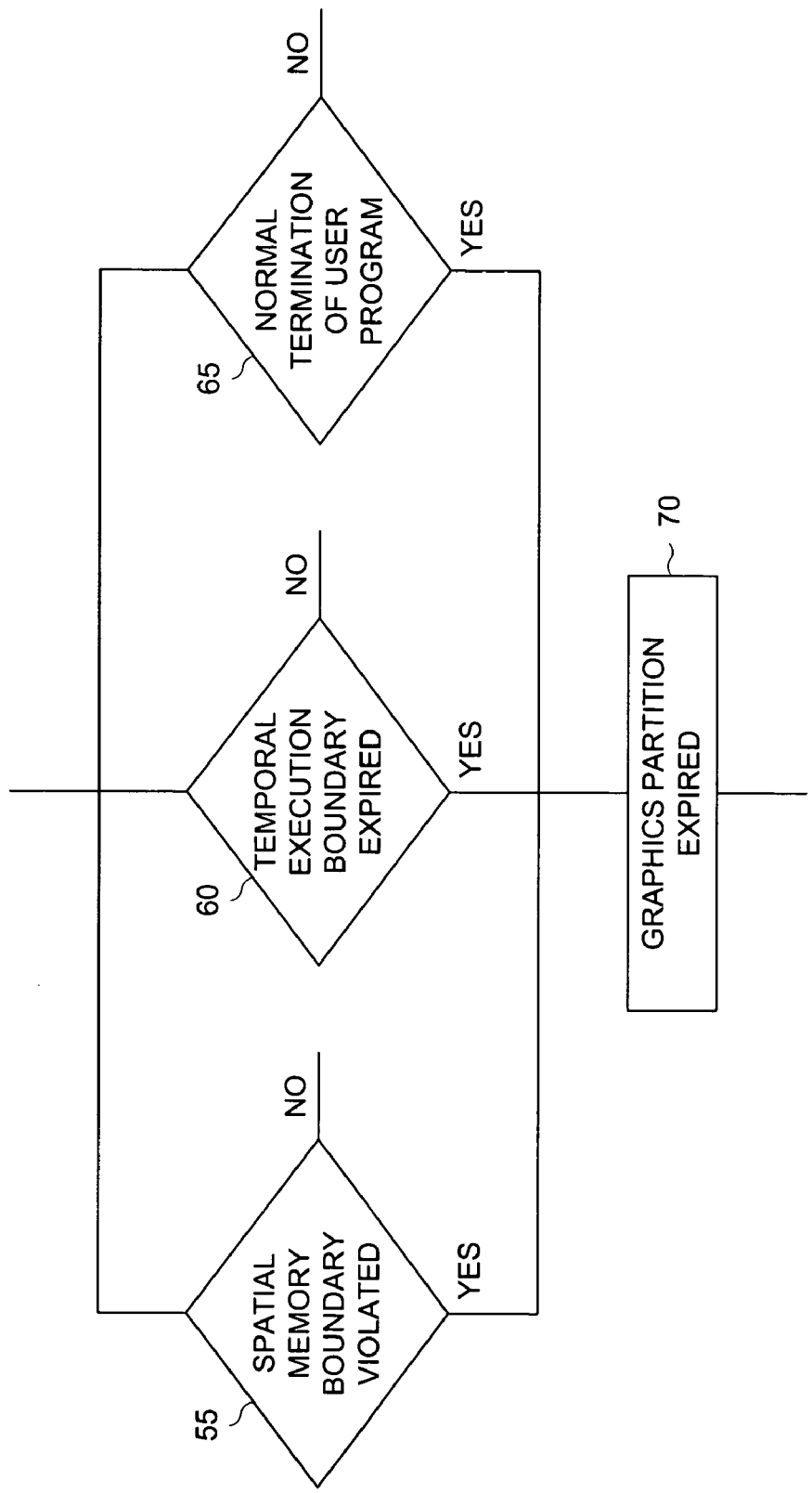
FIG. 7 is a flow diagram that depicts alternative example methods for determining when a user graphics partition expires.

FIG. 7 is a flow diagram that depicts alternative example methods for determining when a user graphics partition expires. Once a user program is executed by an execution unit included in a graphics generator, there must be some means by which the user program is suspended. Otherwise, the user program will prevent orderly establishment of other user partitions within the graphics generator. Accordingly, one alternative method for determining when a graphics partition has expired determines when a spatial memory boundary has been violated (step 55). In one variation of this example method, a spatial memory boundary violation is perceived by comparing a pixel storage cycle generated by a graphics engine's execution unit against an allowable region specifier. When the pixel storage cycle references a pixel address that is outside the allowable region specifier for a particular user context, that particular user context is declared to be expired (step 70).

According to yet another alternative method, determining when a user partition has expired is accomplished by sensing when a temporal execution boundary has expired (step 60). For example, this is accomplished, according to one variation of the present method, by measuring the elapsed execution time of a user program once such execution begins. The elapsed execution time is then compared against a maximum execution time for a particular user context (i.e. user partition). When the elapsed execution time exceeds the maximum execution time for a particular user context, the associated user partition is declared to be expired (step 70).

Not all user programs will be terminated in an exceptional manner. Some user programs will voluntarily relinquish control of the execution unit included in a graphics generator. As such, a normal termination is exhibited by the user program (step 65). When such normal termination occurs, the user context within which the user program was executing is said to be expired (step 70). It should be appreciated that a normal termination of a user program can be affected by executing a special command (e.g. a return-from-user-context command). This special command is then included as a last instruction in a user graphics program.

Figure 8:
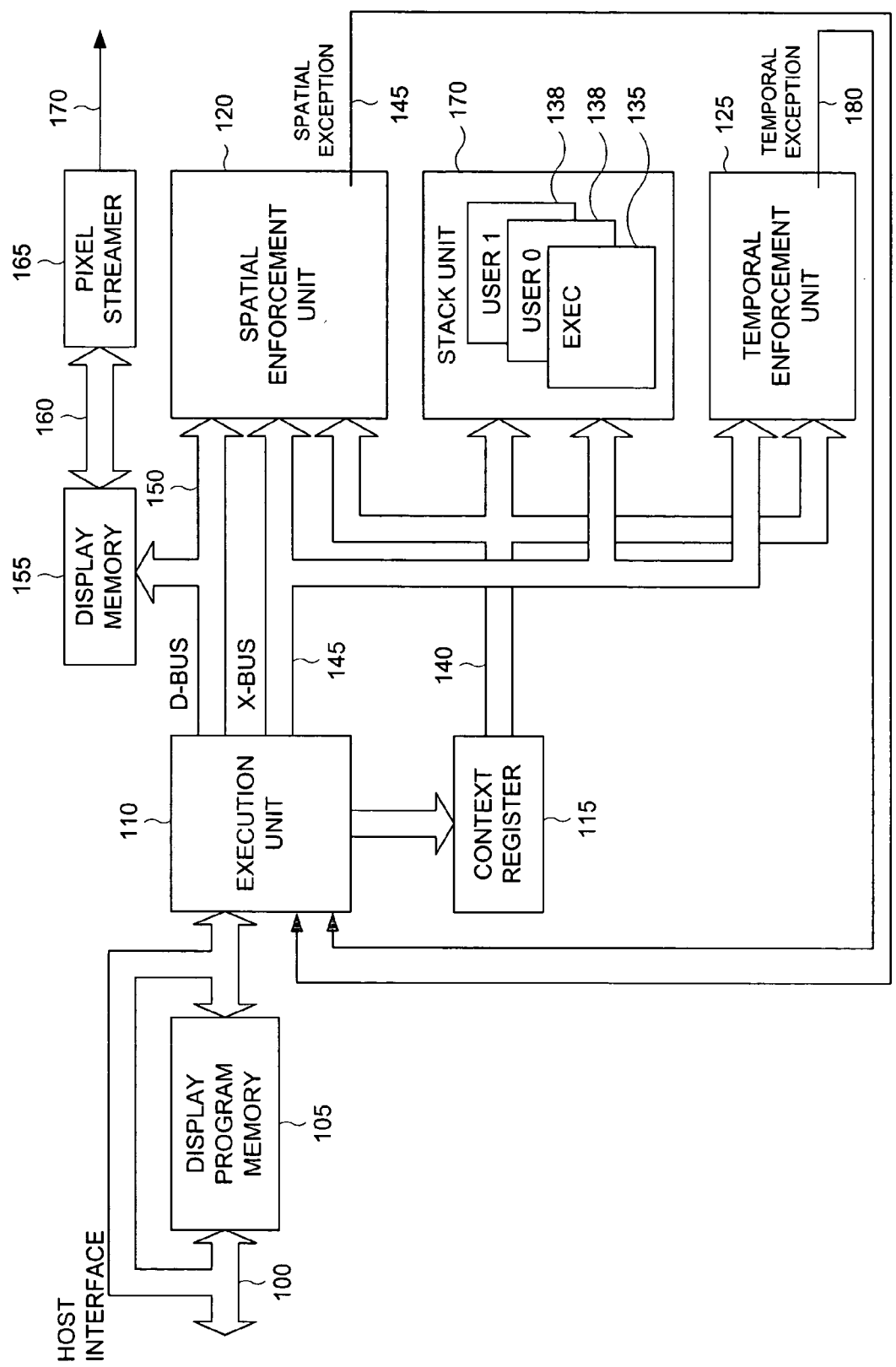
FIG. 8 is a block diagram that depicts several alternative example embodiments of a protected graphics engine.

FIG. 8 is a block diagram that depicts several alternative example embodiments of a protected graphics engine. According to one alternative example embodiment, a protected graphics engine comprises a host interface 100 and an execution unit 110. The host interface 100 enables the protected graphics engine to receive one or more graphics instructions. It should be appreciated that, according to one alternative embodiment, one or more graphics instructions are stored in a display program memory 105 which is included in this alternative embodiment. The display program memory 105, which is an optional feature of a protected graphics engine, is used to store a display program received from the host interface 100. It should be appreciated that the host interface 100, according to yet another alternative embodiment, provides one or more graphics instructions directly to the execution unit 110. Also included in the various example embodiments of a protected graphics engine is a context register 115 and a context expiration unit.

It should be appreciated that the execution unit 110 is generally communicatively associated with the host interface 100 and receives a display program, which includes one or more graphics instructions, from a host processor. The execution unit 110 executes a graphics instruction received either directly from the host interface 100 or from a display program memory 105, which is included in an alternative embodiment of the protected graphics engine. As the execution unit 110 executes a graphics instruction, it creates pixel information in a display memory 155. It should be appreciated that the display memory 155 is an optional feature of a protected graphics engine, which, however, is included in one alternative embodiment of a protected graphics engine. Also included in one alternative embodiment is a pixel streamer 165. The pixel streamer 165 is capable of generating a video signal 170 according to pixel information stored in the display memory 155. The execution unit 110 stores pixel information in the display memory 155 by means of a display bus (D-BUS) 150.

It should further be appreciated that the execution unit 110 is capable of operating in at least one of an executive context and a user context. It should also further be appreciated that the execution unit 110, when a change in a context occurs, stores in a context register 115 a current context identifier.

The current context identifier 140 is then distributed to other elements in a protected graphics engine. The execution unit 110 of this example embodiment includes an external bus (X-BUS) 145. The external bus 145 is used by the execution unit 110 to program other elements that are included in a protected graphics engine.

Figure 8A:
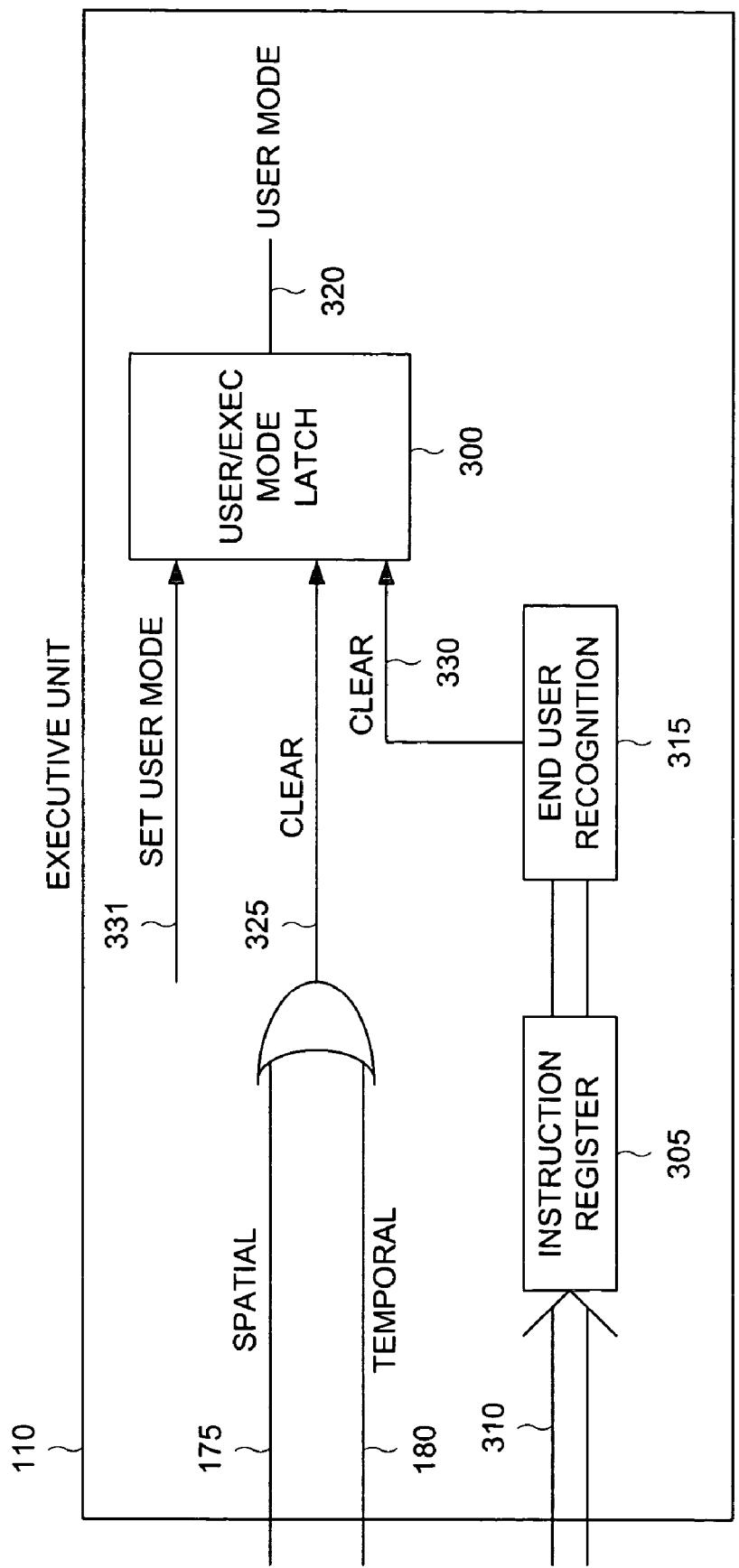
FIG. 8A is a block diagram that depicts an exception processing circuit included in one alternative embodiment of an execution unit.

FIG. 8A is a block diagram that depicts an exception processing circuit included in one alternative embodiment of an execution unit. According to this example alternative embodiment, the execution unit 110 includes a user/exec mode latch 300. The user/exec mode latch 300 generates a user mode flag 320. The user mode flag 320 indicates that the execution unit 110 is operating in a user context. Certain types of instructions that can be executed by the execution unit 10 are privileged instructions. As such, these privileged instructions can only be executed while the user mode flag 320 is inactive (i.e. the execution unit is in an executive context). In operation, the user/exec mode latch 300 is cleared upon reset of the execution unit 110, thereby placing the execution unit 110 in an executive context. One of the privileged instructions that can be executed by the execution unit 110 while it is in the executive context is a call user program in instruction. The call user program instruction typically includes a context identifier parameter, which is stored in the context register 115 as the execution unit executes the call user program instruction. Contemporaneously with storage of the context identifier in the context register 115, the execution unit 110 will set to the user mode flag 320 generated by the user/exec mode latch 300. This is accomplished by momentarily activating a set user mode input 331 which is received by the user/exec mode latch 300.

FIG. 8 further illustrates that the context expiration unit, according to various alternative embodiments, comprises at least one of a spatial enforcement unit 120 and a temporal enforcement unit 125. It should be appreciated that the spatial enforcement unit 120 generates a spatial exception signal 175 when a spatial memory boundary is violated. The spatial exception signal 175, according to one alternative embodiment, is received by the execution unit 110. When active, the spatial exception signal 175 will clear the user mode flag 320. This is accomplished by an exception clear signal 325 which is received by the user/exec mode latch 300. In yet another alternative embodiment, the temporal enforcement unit 125 generates a temporal exception signal 180 when a temporal execution limit is exceeded by a user program. The temporal exception signal 180 is also received by the execution unit 110. When active, the temporal exception signal 180 also clears the user mode flag 320. This also is accomplished by means of a clear signal 325 which is received by the user/exec mode latch 300. It should also be noted that, according to yet another alternative embodiment, the execution unit includes an instruction register 305 that is capable of storing a special user instruction that allows return to an executive context. When the instruction register 305 presents this return-from-user-call instruction, it is recognized as an end user mode instruction by an end-user recognition comparator 315. Accordingly, the end-user recognition comparator 315 generates a user mode clear signal 330, which clears the user/exec mode latch 300.

It should also be appreciated that the execution unit 110 is capable of executing certain graphics instructions which can be used by a display program operating in an executive context to program the spatial enforcement unit 120 and a temporal enforcement unit 125. Typically, these privileged instructions enable an executive program to define one or more partitions by programming the spatial enforcement unit 120 with one or more allowable drawing regions, each corresponding to a particular partition. Also, these privileged structures enable an executive program to define a maximum execution time for one or more user partitions by programming said maximum execution times into the temporal enforcement unit 125. These programming activities are enabled by the use of the external bus 145, which communicatively couples the execution unit 110 to at least one of the spatial enforcement unit 120 and the temporal enforcement unit 125.

FIG. 8 further illustrates that according to another alternative embodiment, the protected graphics engine further comprises a stack unit 130. It should be appreciated that when a user program is executed, the user program will likely benefit from its own private stack. It is also important to note that the execution unit 110, as it continues to operate in an executive context, will require a private executive stack to ensure that an executive program executed by the execution unit 110 is not corrupted by a user program. Accordingly, the stack unit 130 includes at least one of an executive stack 135 and a user stack 138. It should be appreciated that the stack unit 130, according to yet another example embodiment, includes more than one user stack. In operation, the stack unit 130 will receive a current context identifier 140 from the context register 115. The stack unit 130 will use the current context identifier 140 to select an execution stack from amongst the executive stack 135 and the one or more user stacks 138.

Figure 9:
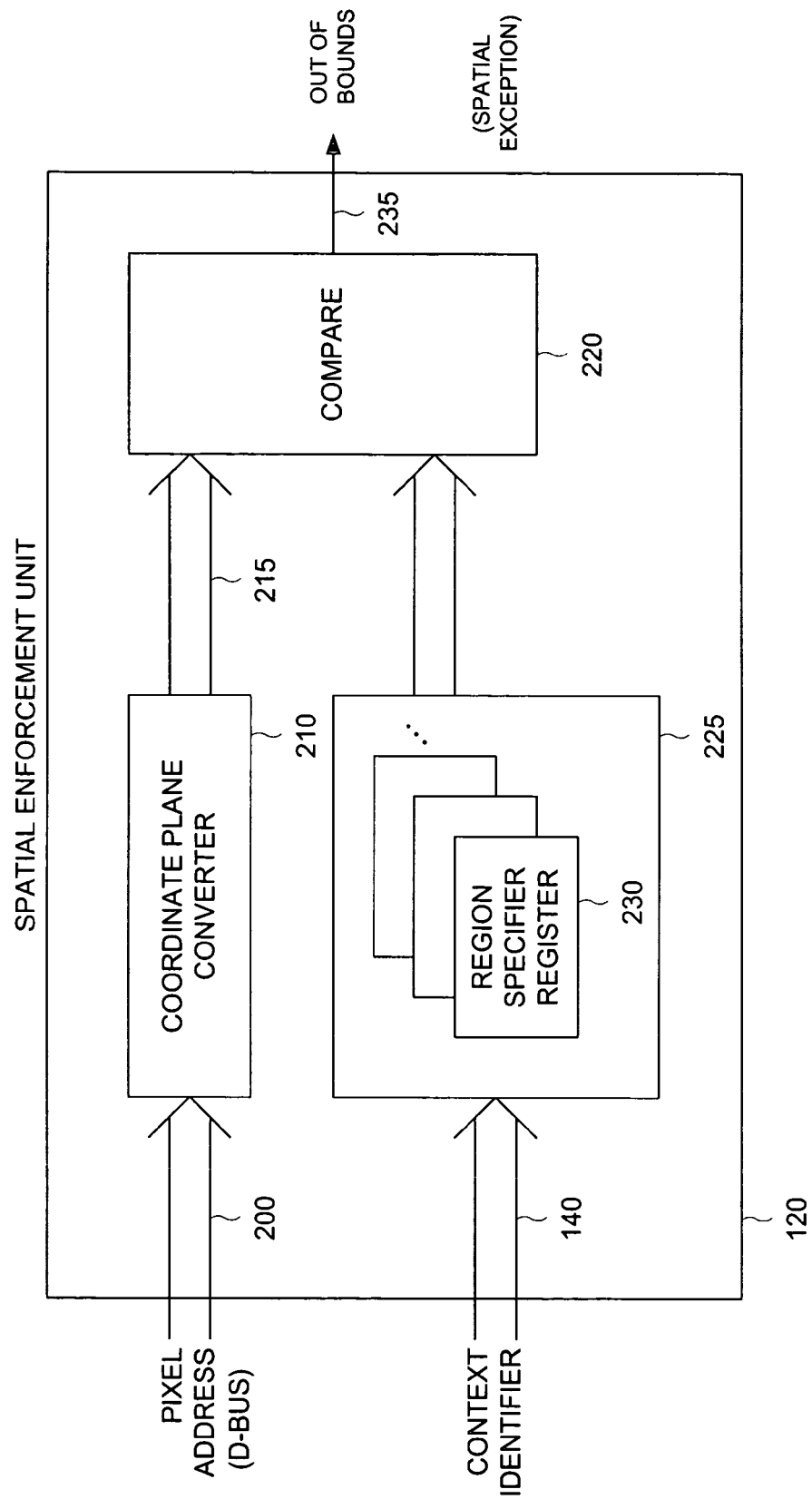
FIG. 9 is a block diagram that depicts one example embodiment of a spatial enforcement unit.

FIG. 9 is a block diagram that depicts one example embodiment of a spatial enforcement unit. According to one alternative embodiment, the spatial enforcement unit is capable of generating an exception signal when a pixel storage cycle generated by the execution unit 110 addresses a portion of a display memory 155 that is outside an allowable region for a particular context. It should be appreciated that an allowable region for a particular context is selected according to the current context identifier 140 provided by the context register 115.

According to one alternative embodiment, the spatial enforcement unit 120 comprises a coordinate plane converter 210. The coordinate plane converter 210 of this alternative embodiment of the spatial enforcement unit 120 receives a pixel address 200, which is typically derived from the display bus 150. The coordinate plane converter 210 converts the pixel address 200 into a coordinate 215 on a drawing plane.

Also included in this alternative embodiment of the spatial enforcement unit 120 is a region specifier table 225. The region specifier table 225 includes one or more region specifier registers 230. A particular region specifier register 230 is selected according to the context identifier 140 received from the context register 115. It should be appreciated that a region specifier register is used to store a drawing region. In one alternative embodiment, the drawing region is stored as a pair of coordinates on a drawing plane, which collectively specify a rectangular drawing region. In another embodiment, the region specifier register is used to store a plurality of segment specifications, wherein the segment specifications collectively define a closed region on a drawing plane. It should be further appreciated that the segment specifications stored in this alternative embodiment of a spatial enforcement unit 120 include at least one of a straight-line segment specification and a curved segment specification. As such, the segment specifications collectively define an irregularly shaped drawing region on a drawing plane. In yet another alternative embodiment, the one or more region specifier registers comprise region specifier memories that are used to store a bitmap. In this alternative embodiment, the bitmap stored in the region specifier memories indicates where a particular graphics partition is allowed to manipulate display memory. It should be noted that the size (and shape) of the region specifier memory for a particular partition is substantially equivalent to the size and shape of the display memory on a pixel-by-pixel basis. However, where the display memory may need several bits per pixel (to store display attributes such as color and highlights), the region specifier memory only requires a single bit per pixel.

The spatial enforcement unit 120 further comprises a comparator 220. The comparator 220 receives an allowable drawing region specification from a selected region specifier register 230 and determines whether or not a pixel address, which is converted to a coordinate on a coordinate plane, lies within the allowable drawing region. In the event that the converted pixel address 215 is outside of the allowable drawing region as specified by a selected region specifier register 230, the comparator 220 generates an out-of-bounds signal 235. The out-of-bounds signal 235 is also known as a spatial exception signal 175.

Figure 10:
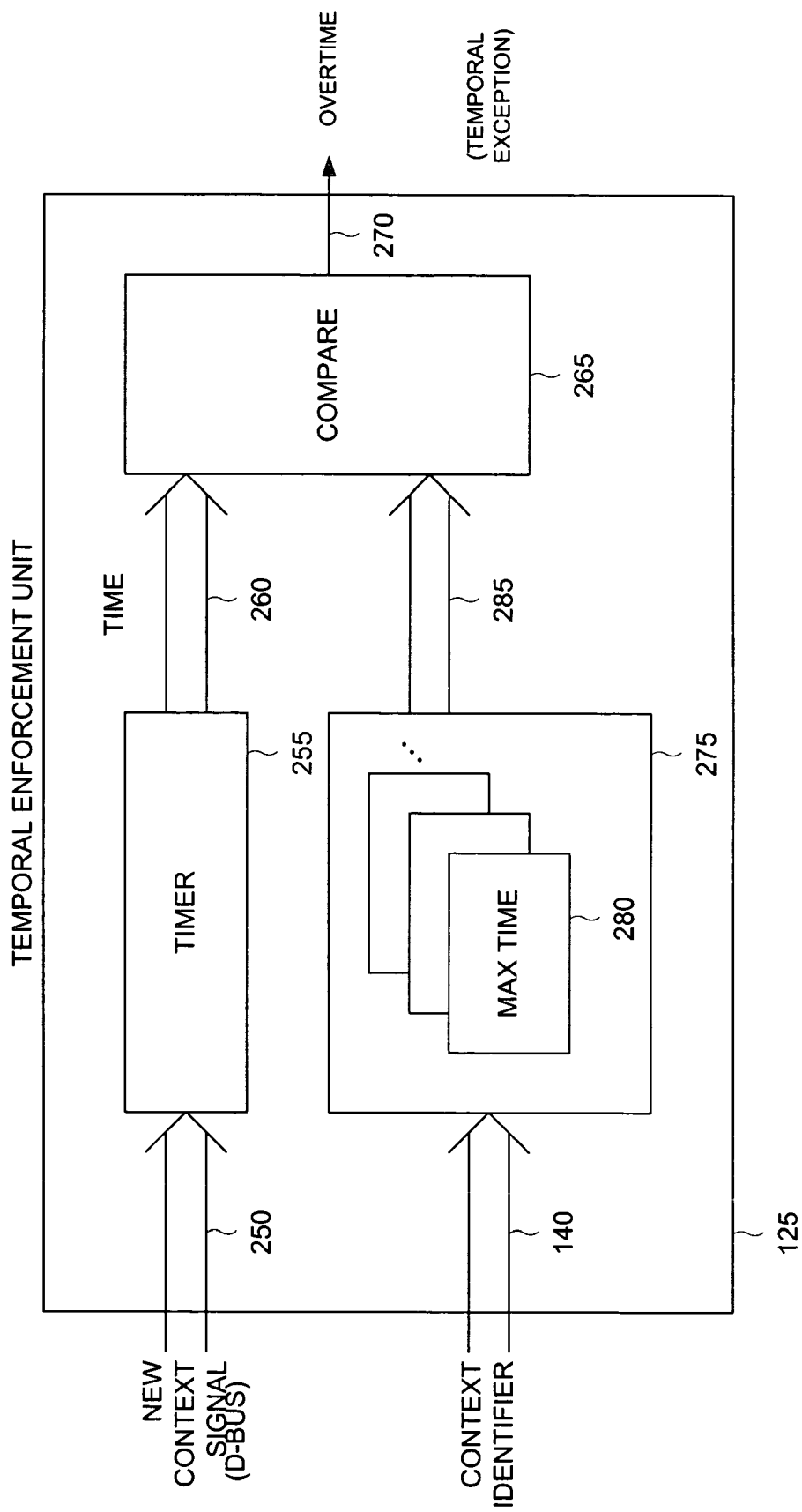
FIG. 10 is a block diagram that depicts one alternative example embodiment of a temporal enforcement unit.

FIG. 10 is a block diagram that depicts one alternative example embodiment of a temporal enforcement unit. It should be appreciated that the temporal enforcement unit of one alternative embodiment is capable of generating an exception signal when a user program attempts to continue execution beyond a temporal boundary for particular context as selected by the current context identifier 140. According to yet another alternative embodiment, the temporal enforcement unit 125 includes a timer 255. The timer 255 is activated by a new context signal 250 whenever the execution unit 110 enters a new user context. Typically, the new context signal 250 is activated when the context register 115 is loaded with a new current context identifier. The timer 255 then measures the amount of time that has elapsed since the new context signal 250 was active. The temporal enforcement unit 125 of this alternative embodiment also includes a maximum time table 275. The maximum time table 275 includes one or more maximum time registers 280. Each maximum time register 280 is capable of storing a maximum time value. A particular maximum time register 280 is selected according to the current context identifier 140 that is received from the context register 115. The value stored in the selected maximum time register 280 (i.e. a maximum time for a particular context 285) is compared against the elapsed time 260 measured by the timer 255. When the maximum time 285 is exceeded by the elapsed time 260, the comparator 265 generates an overtime signal 270. The overtime signal 270 is also known as a temporal exception signal 180.

Figure 11:
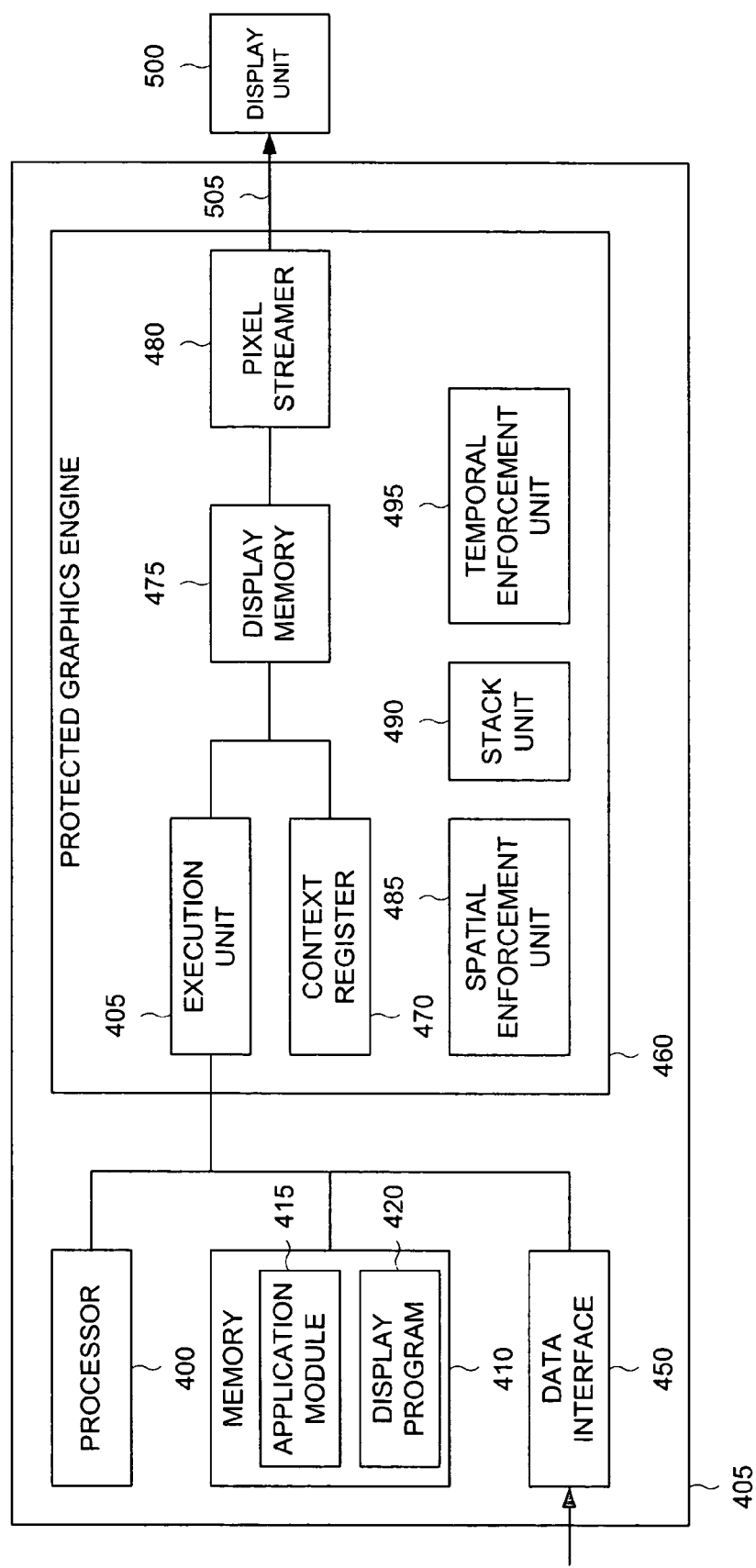
FIG. 11 is a block diagram that depicts one example embodiment of a high integrity information processing and display system.

FIG. 11 is a block diagram that depicts one example embodiment of a high integrity information processing and display system. According to this example embodiment, a high integrity information processing and display system 405 comprises a processor 400 and a memory 410. The memory 410 can be used to store an application module 415 and a display program 420. This example embodiment of a high integrity information processing and display system further comprises a data interface 450, which is capable of receiving application data.

This example embodiment of a high integrity information processing and display system 405 further includes a protected graphics engine 460. The protected graphics engine 460 includes an execution unit 465, the context register 470, a display memory 475 and a pixel streamer 480, all of which operate commensurate with the teachings herein established. In various alternative embodiments, the protected graphics engine further includes at least one of a spatial enforcement unit 485, a stack unit 490 and the temporal enforcement unit 495, all of which operate commensurate with the teachings established heretofore. One alternative embodiment of a high integrity information processing and display system 405 further includes a display unit 500, which is capable of presenting to a user an image according to a video signal 505 generated by the pixel streamer 480.

Figure 12:
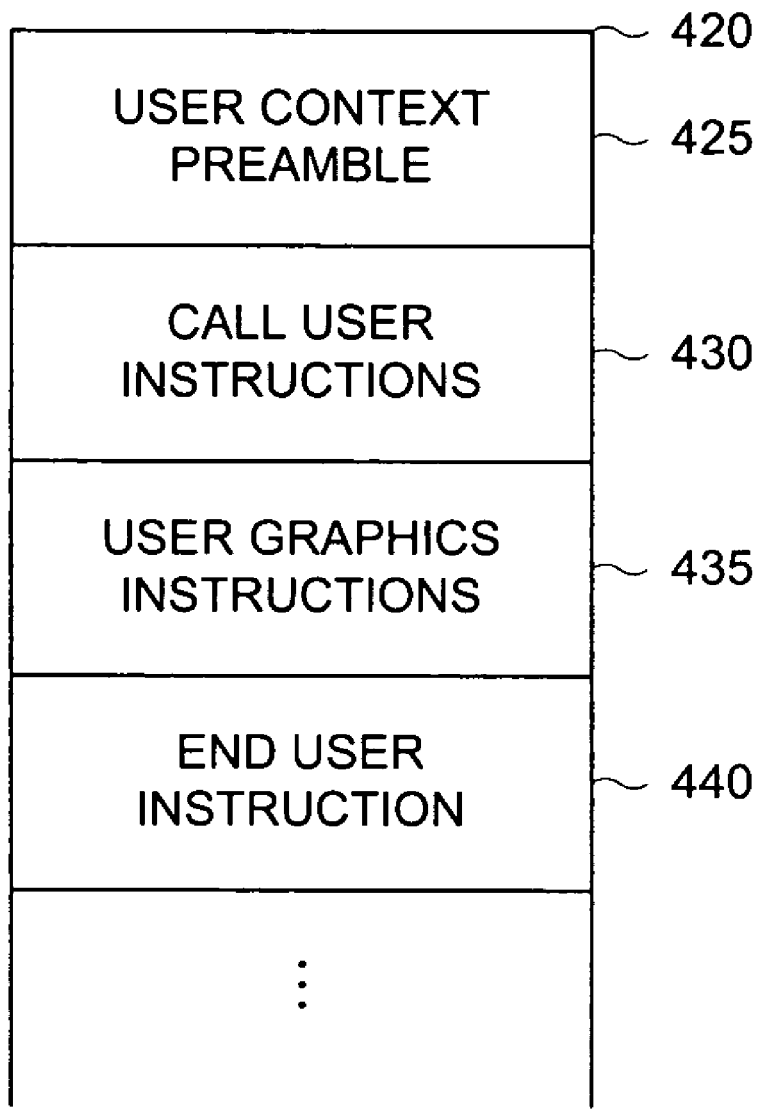
FIG. 12 is a pictorial diagram that illustrates one of structure example structure of a display program.

FIG. 12 is a pictorial diagram that illustrates one of structure example structure of a display program. The display program 420, which is included in one alternative embodiment of a high integrity information processing and display system 405, includes a user context preamble 425. The user context preamble 425, when executed by the execution unit 465, minimally causes the execution unit 465 to establish a user context/partition in the protected graphics engine 460. In operation, the user context preamble 425, according to one alternative embodiment, minimally causes the execution unit 465 to program the spatial enforcement unit 485 with an allowable drawing region for particular context. According to yet another alternative embodiment, the user context preamble 425 minimally causes the execution unit 465 to program the temporal enforcement unit 495 with a maximum execution time for a particular user context.

Once the execution unit 465 executes the user context preamble 425, the display program 420 then presents a call user instruction 430 to the execution unit 465. This minimally causes the execution unit 465 to call a user graphics instruction sequence 435, which is also included in one alternative embodiment of a display program 420. The user graphics instruction sequence 435 minimally causes the execution unit 465 to generate pixel information in the display memory 475. As already discussed, the pixel streamer 480 retrieves the pixel information from the display memory 475 in order to generate a video signal 505. When the user graphics instruction sequence finishes executing, the execution unit 465 executes an end-user instruction 440. The end-user instruction 440, which can be in the form of a return from user program instruction, minimally causes the execution unit 465 to revert to an executive context. Reverting to an executive context may also be caused by realizing a spatial or temporal exception. It should be noted that the call user instruction 430 causes the execution unit to adopt a user context and to load a current context identifier into the context register 470 before actually executing the user graphics instructions 435.

While the present method and apparatus have been described in terms of several alternative methods and embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for protected graphics generation comprising:
   providing a system processor configured to execute an application and further configured to generate graphics instructions;
   providing a separate graphics processor configured to perform graphic rendering functions as commanded by the graphics instructions output from the system processor;
   establishing, in the graphics processor, a user graphics partition in an executive context, where the user graphics partition has an associated limited user context, with an associated limited access to said graphics processor;
   switching to the associated limited user context which associated with the user graphics partition;
   executing a user graphics program in the associated limited user context;
   determining when the user graphics partition expires; and
   switching back to the executive context when the user graphics partition expires.

2. The method of claim 1 wherein establishing a user graphics partition comprises establishing, in the separate graphics processor, a program stack for the user partition.

3. The method of claim 1 wherein establishing a user graphics partition comprises establishing, in the separate graphics processor, a spatial memory boundary.

4. The method of claim 3 wherein establishing a spatial memory boundary comprises establishing, in the separate graphics processor, a drawing space on a coordinate plane.

5. The method of claim 1 wherein establishing a user graphics partition comprises establishing, in the separate graphics processor, a temporal execution boundary.

6. The method of claim 5 wherein establishing a temporal execution boundary comprises establishing, in the separate graphics processor, a maximum execution time.

7. The method of claim 1 wherein determining when the user graphics partition expires comprises at least one of recognizing that a spatial memory boundary has been violated, recognizing that a temporal execution boundary has expired and recognizing a normal termination of a user graphics program.

8. A method for protected graphics generation comprising:
   providing a system processor configured to execute an application and further configured to generate graphics instructions;
   providing a separate graphics processor configured to perform graphic rendering functions as commanded by the graphics instructions output from the system processor;
   establishing, in the graphics processor, a user graphics partition in an executive context, where the user graphics partition has an associated limited user context, with an associated limited access to said graphics processor;
   switching to the associated limited user context which associated with the user graphics partition;
   executing a user graphics program in the associated limited user context;
   determining when the user graphics partition expires;
   switching back to the executive context when the user graphics partition expires; and
   wherein establishing a user graphics partition comprises establishing, in the separate graphics processor, a program stack for the user partition.

9. A method for protected graphics generation comprising:
   providing a system processor configured to execute an application and further configured to generate graphics instructions;
   providing a separate graphics processor configured to perform graphic rendering functions as commanded by the graphics instructions output from the system processor;
   establishing, in the graphics processor, a user graphics partition in an executive context, where the user graphics partition has an associated limited user context, with an associated limited access to said graphics processor;
   switching to the associated limited user context which associated with the user graphics partition;
   executing a user graphics program in the associated limited user context;
   determining when the user graphics partition expires;
   switching back to the executive context when the user graphics partition expires; and
   wherein establishing a user graphics partition comprises establishing, in the separate graphics processor, a spatial memory boundary.

10. A method for protected graphics generation comprising:

providing a system processor configured to execute an application and further configured to generate graphics instructions;

providing a separate graphics processor configured to perform graphic rendering functions as commanded by the graphics instructions output from the system processor;

establishing, in the graphics processor, a user graphics partition in an executive context, where the user graphics partition has an associated limited user context, with an associated limited access to said graphics processor;

switching to the associated limited user context which associated with the user graphics partition;

executing a user graphics program in the associated limited user context;

determining when the user graphics partition expires;

switching back to the executive context when the user graphics partition expires;

wherein establishing a user graphics partition comprises establishing, in the separate graphics processor, a temporal execution boundary; and wherein establishing a temporal execution boundary comprises establishing, in the separate graphics processor, a maximum execution time.

11. A method for protected graphics generation comprising:

providing a system processor configured to execute an application and further configured to generate graphics instructions;

providing a separate graphics processor configured to perform graphic rendering functions as commanded by the graphics instructions output from the system processor;

establishing, in the graphics processor, a user graphics partition in an executive context, where the user graphics partition has an associated limited user context, with an associated limited access to said graphics processor;

switching to the associated limited user context which associated with the user graphics partition;

executing a user graphics program in the associated limited user context;

determining when the user graphics partition expires;

switching back to the executive context when the user graphics partition expires; and wherein determining when the user graphics partition expires comprises at least one of recognizing that a spatial memory boundary has been violated, recognizing that a temporal execution boundary has expired and recognizing a normal termination of a user graphics program.

* * * * *